United States Patent [19]

Montgomery

[11] Patent Number: 4,607,432

[45] Date of Patent: Aug. 26, 1986

[54] HUNTING KNIFE FOR FIELD DRESSING AN ANIMAL

[76] Inventor: Calvin W. Montgomery, P.O. Box 207, Inverness, Miss. 38753

[21] Appl. No.: 694,329

[22] Filed: Jan. 24, 1985

[51] Int. Cl.[4] ............................................. B26B 29/00
[52] U.S. Cl. ........................................ 30/294; 17/21; 128/305
[58] Field of Search ......................... 30/289, 293, 294; 128/305; 17/20, 21

[56] References Cited

U.S. PATENT DOCUMENTS

| | | | |
|---|---|---|---|
| 1,299,084 | 4/1919 | Wilson | 17/21 X |
| 2,906,021 | 9/1959 | Cromoga | 30/293 |
| 3,581,326 | 6/1971 | Hayes et al. | 7/8.1 |

OTHER PUBLICATIONS

Basic Hunter's Guide, National Rifle Association, 1982, pp. 232-233.

Primary Examiner—Douglas D. Watts
Attorney, Agent, or Firm—Fleit, Jacobson, Cohn & Price

[57] ABSTRACT

The present invention discloses a hunting knife which includes a hunting knife blade and a retractable gut hook. When the gut hook is in its retracted position, the hunting knife blade is fully operational for normal usage. When the gut hook is in its fully extended position, the point of the hunting knife blade is protected from cutting the entrails of an animal being field dressed and the skin of the animal is elevated for cutting by the hunting knife blade.

14 Claims, 10 Drawing Figures

HUNTING KNIFE FOR FIELD DRESSING AN ANIMAL

BACKGROUND OF THE INVENTION

Field dressing is the procedure performed by a hunter to remove the entrails and skin from an animal to prevent the meat and the hide from being spoiled. To field dress an animal, the animal is laid on its side or, if possible, on its back, so that the hunter has access to the underside of the animal.

One method of field dressing includes the use of a single blade hunting knife. An incision is first made by the point of the knife through the skin and abdominal wall of the animal and then the skin of the animal is cut from the crotch to the throat by the blade of the hunting knife. Extreme care must be exercised so as not to puncture the intestines or the stomach of the animal with the point of the knife since this would spoil the meat and hide of the animal.

To avoid the accidental cutting of the entrails of the animal, an experienced hunter (as shown in FIG. 10), with one hand, forms an incision through the skin of the animal in the crotch area with the point of a hunting knife. As the blade of the hunting knife is moved away from the hunter, the incision made in the crotch area is extended to the throat of the animal. The other hand of the hunter is placed below and slightly in front of the point of the blade of the knife to push away the entrails of the animal to avoid the entrails being cut by the point of the hunting knife. This is a relatively slow process and is usually only performed correctly by experienced hunters.

Another method of field dressing an animal is by the use of a multi-blade knife which includes a pointed hunting knife blade and a field dressing knife blade, used independently of one another. The field dressing blade includes a blunted point and a sharp cutting edge. The multi-blade knife is used by first outwardly unfolding the pointed hunting knife blade from the handle and making an incision in the animal in the crotch area. Then, the hunting knife blade is folded inwardly into the knife handle. The field dressing blade is then unfolded outwardly from the handle and used to field dress the animal, starting at the incision made by the pointed hunting knife blade and proceeding towards the throat. The blunted point of the field-dressing blade separates the hide from the meat of the animal without cutting the entrails of the animal. The sharp cutting edge of the field dressing knife blade cuts the skin of the animal.

Still another method of field dressing an animal includes the use of a "Wyoming" knife. The "Wyoming" knife is a single blade, "U" shape knife, made of surgical steel. One end of the "U" is secured to a handle and the other end terminates in a dulled point. The cutting blade is similar to a single edge razor and is replaced when dull. An incision is made in the throat area prior to the use of the "Wyoming" knife, by another shape edged knife blade. The dulled knife point of the "Wyoming" knife is oriented towards the hunter and the cutting action is performed, after the incision has been made by another knife blade, by pulling the "Wyoming" knife towards the hunter rather than the usual cutting motion moving away from the hunter. As the "Wyoming" knife is pulled from the throat to the crotch of the animal, the dulled point of the "Wyoming" knife rides under the skin of the animal pulling up the skin of the animal in advance of the cutting blade.

The "Wyoming" knife requires replacement of its blade after relatively short usage. The blade is removed from the handle by the unscrewing of two screws which secure the blade to the handle. The screws are removed by a screwdriver or a coin. Extra blades are usually carried with the "Wyoming" knife due to the required replacement of the blade after periods of use.

The present invention overcomes all the disadvantages of the previously known field dressing knives for eviscerating and skinning of an animal.

SUMMARY OF THE INVENTION

The retractable gut hook of the present invention is used in combination with a hunting knife blade. The hunting knife blade and its handle are made of a single piece of stainless steel. The retractable gut hook is journalled in the handle to pivot from a rest position to an extended position about an axis extending perpendicular to the longitudinal axis of the knife and its handle. In the rest position, the gut hook is folded within the handle of the hunting knife blade. In the extended position, two sides of the gut hook extend parallel to the hunting knife blade on opposite sides of the hunting knife blade and prevent an object from coming in contact with the point of the hunting knife blade. The gut hook specifically protects the point of the hunting knife blade from contacting the entrails or skin of an animal during field dressing.

The retractable gut hook of the present invention has the following advantages over the prior art:

(1) in the retracted position of the gut hook, the hunting knife blade is available for normal everyday use;

(2) no tools are required to locate the retractable gut hook in its operative position on both sides of the knife blade;

(3) the hunting knife blade is accessible and is therefore resharpenable easier than a field dressing blade having a blunt point or a "Wyoming" knife;

(4) no extra blades are required to be carried for replacement of dull blades, as is required for the "Wyoming" knife;

(5) the hunting knife of the present invention includes only one blade for field dressing an animal, instead of the required two knife blades of a multi-blade knife and a second blade for use with a "Wyoming" knife to form the initial incision; and (6) the hunting knife of the present invention is easier to clean-up than a multi-blade knife or "Wyoming" knife since all its parts are exposed.

It is an object of the present invention to provide a hunting knife having a single knife blade for making an incision and field dressing an animal without cutting the entrails of the animal.

DETAILED DESCRIPTION OF THE DRAWINGS

Figure 10:
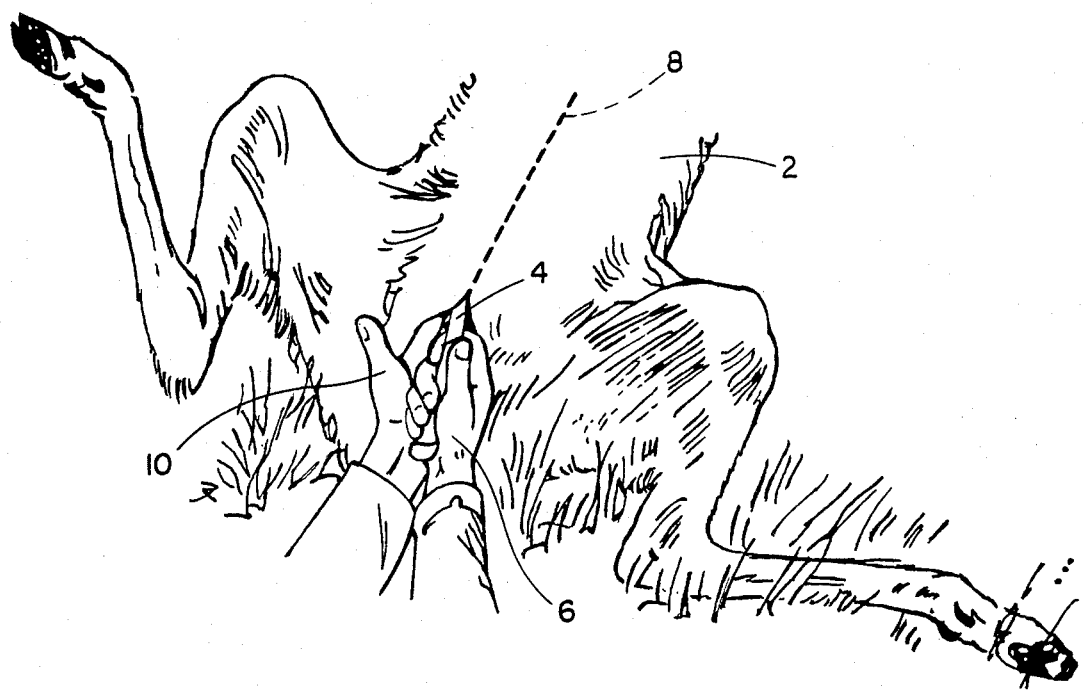
FIG. 10 illustrates a known method of field dressing a deer.

In FIG. 10, the most widely used method of field dressing a deer 2 is shown. An incision is made in the crotch of the deer by a sharp pointed knife 4 held in the right hand 6 of the hunter. The hunter then proceeds to move the knife along a longitudinal line 8, shown in phantom, from the crotch area to the throat of the deer. As the right hand 6 moves the cutting edge of the sharp pointed knife 4 along the line 8, the left hand 10 of the hunter positions the index finger on one side of the knife blade 4 and the middle finger on the other side of the knife blade 4. Both fingers are positioned below the blade 4, slightly leading the point of the knife, to form a protected channel between the fingers for passage of the point of the blade. The two fingers on either side of the blade push the entrails of the deer downward and away from the skin of the animal. The entrails are pushed away from the point of the knife to prevent cutting of the entrails by the sharp point of the blade. By the method shown in FIG. 10, there is always the danger of accidentally cutting the fingers of the hunter being guided blindly near the point of the knife and there is also the possibility of accidentally cutting the entrails of the deer, thus spoiling the meat and the hide.

Figure 1:
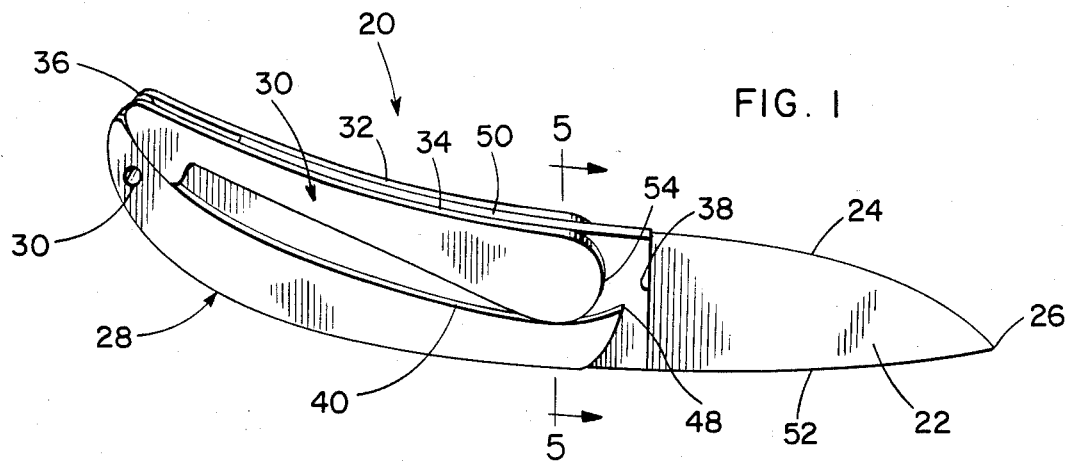
FIG. 1 is a side view of the hunting knife of the present invention with a gut hook shown in its retracted position.

The hunting knife 20 of the present invention, shown in FIG. 1, avoids the possibility of accidentally cutting the fingers of the hunter or accidentally cutting the entrails of the animal to spoil the meat or hide of the animal. Hunting knife 20 includes hunting knife blade 22 having a sharp edge 24, back 52 and point 26. The handle, generally shown at 28, and blade 22 are made of a single piece of stainless steel. Hole 30 located at one end of the handle allows passage of a string or other tying implement.

The retractable gut hook, generally shown at 30, is pivotable about an axis extending perpendicular to the longitudinal axis of the handle 28 and the blade 22. The gut hook includes two side portions 32 and 34 spaced from one another and interconnected by separation block 36. In FIG. 1, the gut hook 30 is shown in a retracted, rest position. The heel 38 of the blade 22 is spaced in front of the curved end 54 of the side portions 32 and 34 and is also spaced from the end 48 of laterally extending handle portions 40.

Figure 5:
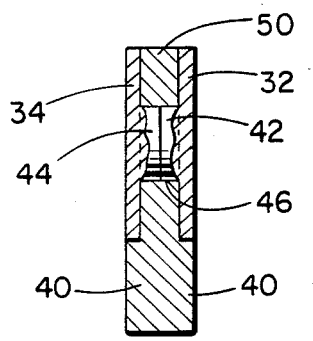
FIG. 5 is a sectional view taken along the line 5—5 of FIG. 1, with a partial full view of the journal connection for the gut hook.

In FIG. 5, the sides of the gut hook 32 and 34 are shown on opposite sides of the recessed handle portion 50 forming a flush exterior surface with the laterally extending handle portions 40. Each of the side portions 32 and 34 define a cylindrical projection 42 and 44 projecting through a circular opening 46 which is defined by the recessed handle portion 50. The ends of projections 42 and 44 abut at the center of opening 46. The cylindrical projections 42 and 44 are rotatable within circular opening 46 about an axis extending perpendicular to the longitudinal axis of the handle 28 and the blade 22.

In FIG. 1, stop 48 is shown at one end of laterally extending handle portion 40 extending beyond the axis of the cylindrical projections 42 and 44. When the gut hook 30 is rotated about cylindrical projecting portions 42 and 44, the side portions 32 and 34 are stopped from further rotation by engagement with stops 48.

Figure 2:
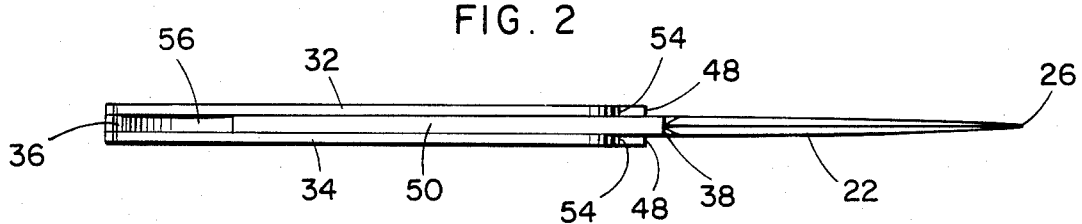
FIG. 2 is a plan view of the hunting knife of FIG. 1 with the gut hook shown in the retracted position.

In FIG. 2, cutting edge 24 of blade 22 is more clearly shown. Sides 32 and 34 of the gut hook are shown spaced on opposite sides of the recessed handle portion 50. A curved end 54 of each side portion 32 and 34 of the gut hook 30 terminates in advance of stop 48 of extended handle portions 40.

Figure 3:
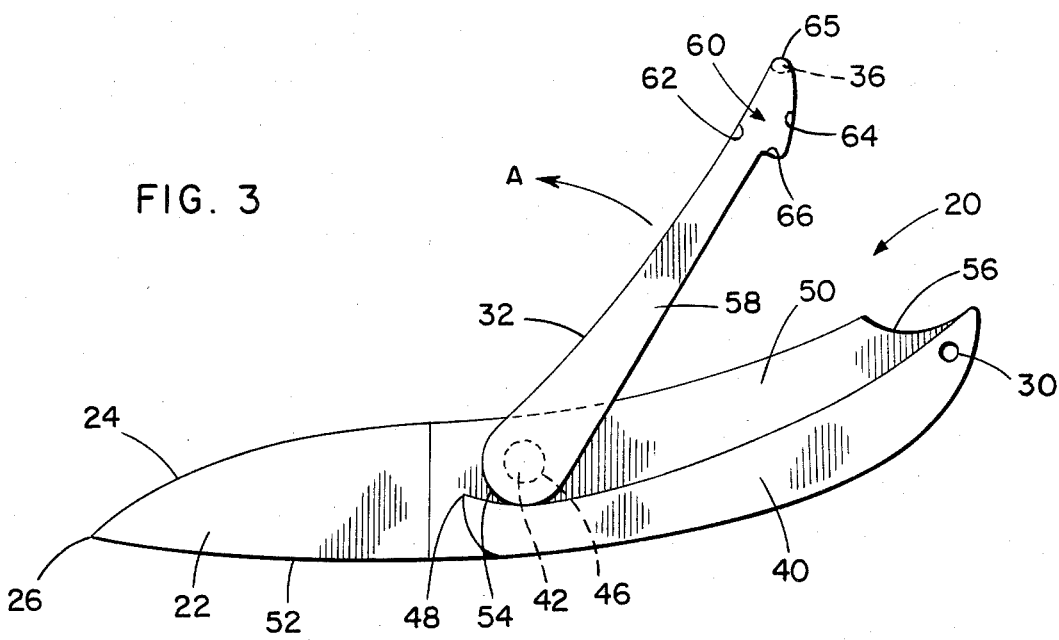
FIG. 3 is a side view of the hunting knife of FIG. 1 with the gut hook shown in a partially extended position.
Figure 4:
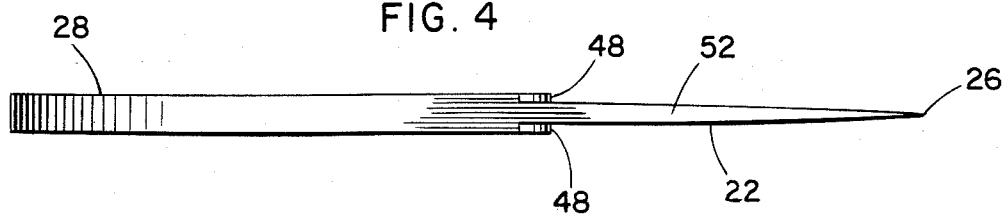
FIG. 4 is a bottom view of the hunting knife shown in FIG. 1.

In FIG. 3, gut hook 30 is shown pivoted partially around cylindrical portions 42 and 44 journalled within a circular opening 46. The gut hook 30 is rotated in the direction of arrow A towards the blade 22 and towards its fully extended position. After pivoting of the gut hook away from the handle, a curved recess 56 of recessed handle portion 50 is exposed located at the end of the handle, near the opening 30. The recess 56 allows the gut hook 30 to be fully retracted within the handle without the separation block 36 contacting any part of the handle.

Each side portion 32 and 34 of the gut hook 30 includes an elongated shank 58 terminating at one end at curved portion 54 and at the other end at hook portion 60. Hook portions 60 of each of the side portions 32 and 34 are interconnected by separating block 36 which is welded to the tip 65 of both side portions 32 and 34. One side 62 of the hook portion 60 is continuous with a side of the shank portion 58. The other side 64 of the hook portion 60 extends above the plane continuous with the other side of the shank 58. Spacing portion 66 of hook portion 60 separates one side of the shank 58 from side 64.

Figure 6:
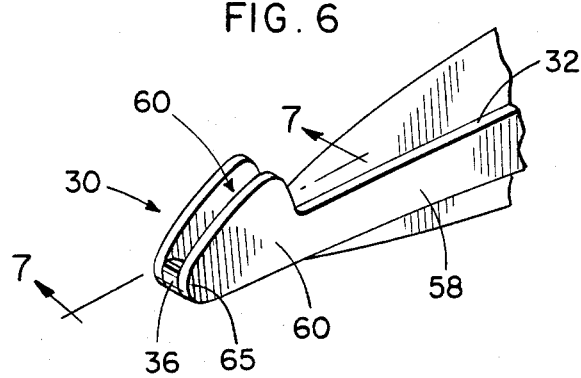
FIG. 6 is a perspective view of the gut hook in a fully extended position located on both sides of the hunting knife blade.
Figure 7:
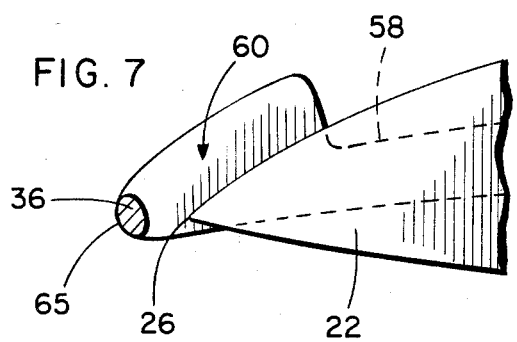
FIG. 7 is a sectional view taken along the line 7—7 shown in FIG. 6.

In FIGS. 6 and 7, the gut hook is shown in the fully extended position. In the fully extended position, hook shape portion 60 of each side portion 32 and 34 of the gut hook are located on and spaced from opposite sides of the point 26 of the blade 22 and extend slightly ahead of the blade point 26. In the fully extended position, the point 26 is protected from contacting anything above or below, on either side of and ahead of the point by the hook portions 60 of the sides 32 and 34.

Figure 8:
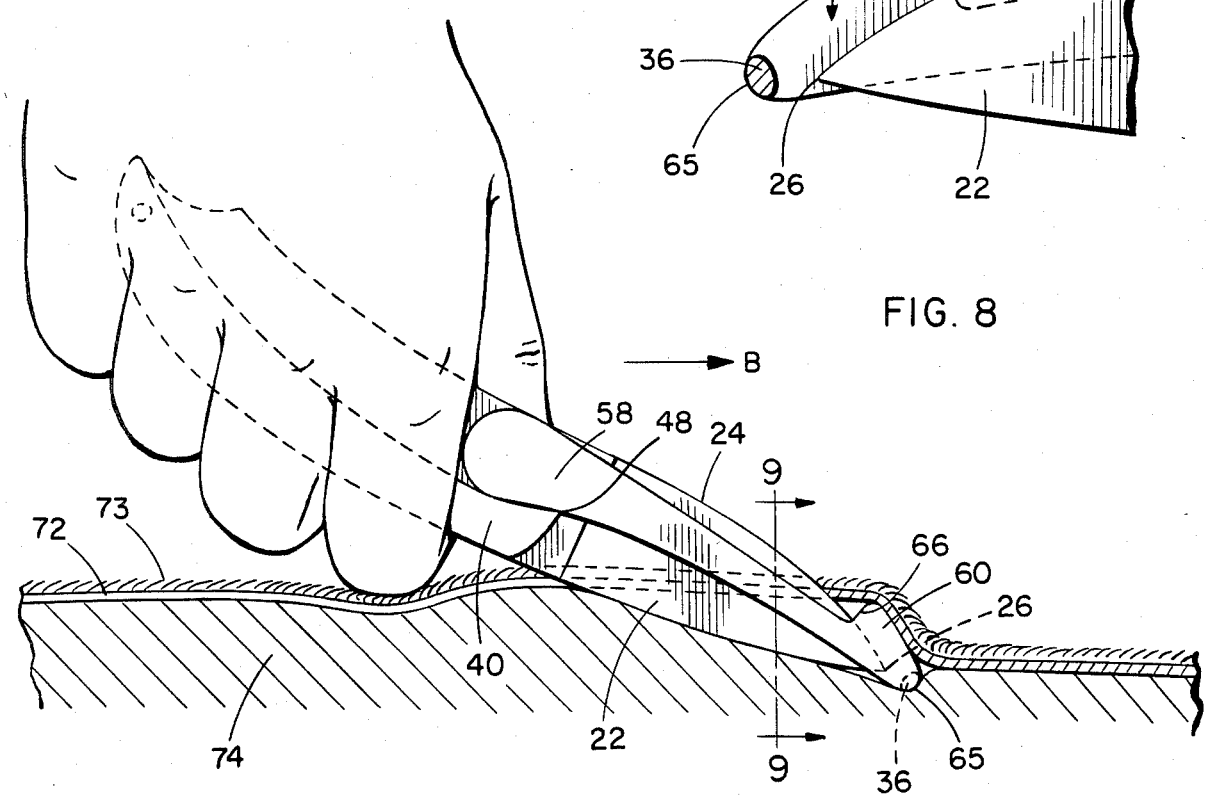
FIG. 8 is a side view of the hunting knife of the present invention being used for field dressing an animal, with the gut hook in the fully extended position.

The use of the hunting knife of the present invention will now be described with reference to FIGS. 8 and 9. An incision is first made in the crotch area of the animal to be field dressed, through the skin 72 and hide 73. The incision is made by the point 26 of the hunting knife blade 22. Care is taken so that the initial incision made by the point of the blade does not contact the entrails 74 of the animal. After the incision has been made, the gut hook 30 is rotated from its retracted position, about projecting cylindrical portions 42 and 44, to the fully extended position shown in FIG. 8.

In the fully extended position, the gut hook shanks 58 rest against stops 48 of the laterally extending handle portions 40. The hunting knife blade 22, with the gut hook in the fully extended position is then inserted through the incision and under the hide of the animal to be field dressed. The hunting knife is held at an angle of approximately 30° to the skin 72 of the animal and is moved in the direction shown by arrow B. As the knife is progressively moved in the direction of arrow B, the hook portions 60 lift the skin 72 and hide 73 of the animal away from the entrails and spaces the entrails and the skin 72 from the point 26. Rounded tip portion 65 of the hook portion 60 contacts the entrails and slides across them to prevent the tip 26 of the knife blade 27 from contacting the entrails 74. Spacing portions 66 of hook portions 60 lift the skin 72 of the animal a slight distance above the edge 24 of the hunting knife blade 22 so that the skin 72 is held taunt as it encounters edge 24 of the hunting knife blade 22. A clean cut is thereby provided by cutting edge 24.

Figure 9:
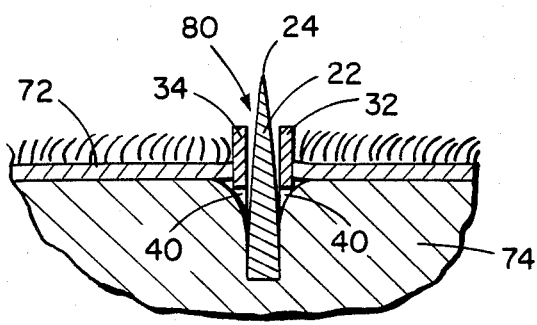
FIG. 9 is a sectional view taken along the line 9—9 shown in FIG. 8.

As shown in FIG. 9, a channel 80 is formed between the sides 32 and 34 of the gut hook for the hunting knife blade 22, serving a similar function as the guiding fingers of the skilled hunter shown in FIG. 10. However, by the use of the gut hook of the present invention, any hunter is capable of safe and proper field dressing of an animal.

The gut hook provides an easily engageable protection for the point of a hunting knife blade and also permits the hunting knife blade to be used for other purposes when the gut hook is in its retracted position.

The foregoing disclosure and drawings are merely illustrative of the principles of this invention and are not to be interpreted in a limiting sense. It is to be understood that there is no desire to be limited to the exact details and construction shown and described because obvious modifications will occur to a person skilled in the art.

I claim:

1. A hunting knife for field dressing an animal, said hunting knife comprising:
   a knife handle,
   a hunting knife blade extending from one end of said knife handle, said hunting knife blade including a point located at the end of the hunting knife blade opposite to said knife handle and a cutting edge extending between said knife handle and said point,
   a gut hook pivotably mounted at one end on said handle for moving between a retracted position and an extended position and said gut hook, when in said extended position, protects said point from contacting the entrails and the skin of the animal during longitudinal cutting of the skin of the animal,
   said gut hook includes two side portions spaced from one another and located on opposite sides of said hunting knife blade when said gut hook is in the extended position, and
   said knife handle defines two recesses for receiving said two side portions in said retracted position.

2. A hunting knife for field dressing an animal as in claim 1, further comprising means for connecting said two side portions to each other located at the end of said gut hook opposite to the end pivotably mounted on said knife handle.

3. A hunting knife for field dressing an animal as in claim 2, wherein said two side portions define a channel therebetween, said hunting knife blade being located in said channel when said gut hook is in said extended position.

4. A hunting knife for field dressing an animal as in claim 1, wherein said gut hook includes at least one projecting portion journalled in said knife handle for pivotably mounting said gut hook on said knife handle.

5. A hunting knife for field dressing an animal as in claim 1, wherein the end of each of said two side portions located opposite to the end of the gut hook pivotably mounted on said knife handle, define a hook shaped portion, said hook shaped portions space the entrails of the animal from the skin of the animal during field dressing when said gut hook is in the extended position to prevent contact of the entrails and skin with the point of the hunting knife blade and to lift the skin of the animal in advance of the skin being cut by said cutting edge.

6. A hunting knife for field dressing an animal as in claim 1, wherein each of said two side portions define an elongated shank and a hook shaped portion, said hook shaped portions space the entrails of the animal from the skin of the animal during field dressing when said gut hook is in the extended position to prevent contact of the entrails and skin with the point of the hunting knife blade and to lift the skin of the animal in advance of the skin being cut by said cutting edge projecting above said shanks.

7. A hunting knife for field dressing an animal as in claim 5, further comprising means for connecting said two side portions to each other located at the end of said gut hook opposite to the end pivotably mounted on said knife handle.

8. A hunting knife for field dressing an animal as in claim 6, further comprising means for connecting said two side portions to each other located at the end of said gut hook opposite to the end pivotably mounted on said knife handle.

9. A hunting knife for field dressing an animal, said hunting knife comprising:
   a knife handle;
   a hunting knife blade extending from one end of said knife handle, said hunting knife blade including a point located at the end of the hunting knife blade opposite to said knife handle and a cutting edge extending between said knife handle and said point;
   a gut hook pivotably mounted at one end on said handle for moving between a retracted position and an extended position and said gut hook, when in said extended position, protects said point from contacting the entrails and the skin of the animal during longitudinal cutting of the skin of the animal in a direction extending ahead of said point of said hunting knife blade;
   said gut hook includes two side portions spaced from one another and located on opposite sides of said hunting knife blade when said gut hook is in the extended position;
   connecting means for connecting said two side portions to each other, said connecting means being located at the end of said gut hook opposite to the end of the gut hook which is pivotably mounted on said knife handle so that said point of said hunting knife blade is protected when said hunting knife is moved in said direction for longitudinal cutting; and
   stop means defined by said knife handle for stopping continued movement of said gut hook beyond said extended position when said gut hook is moved from said retracted position to said extended position so that said gut hook is held in said extended position during said longitudinal cutting.

10. A hunting knife as claimed in claim 9, wherein the end of each of said two side portions located opposite to the end of the gut hook pivotably mounted on said knife handle, define a hook shaped portion, said hook shaped portions space the entrails of the animal from the skin of the animal during field dressing when said gut hook is in the extended position to prevent contact of the entrails and skin with the point of the hunting knife blade and to lift the skin of the animal in advance of the skin being cut by said cutting edge.

11. A hunting knife for field dressing an animal, said hunting knife comprising:
   a knife handle;
   a hunting knife blade extending from one end of said knife handle, said hunting knife blade including a point located at the end of the hunting knife blade opposite to said knife handle and a cutting edge extending between said knife handle and said point;
   a gut hook pivotably mounted at one end on said handle for moving between a retracted position and an extended position and said gut hook, when in said extended position, protects said point from contacting the entrails and the skin of the animal during longitudinal cutting of the skin of the animal in a direction extending ahead of said point of said hunting knife blade,
   said gut hook includes two side portions spaced from one another and located on opposite sides of said hunting knife blade when said gut hook is in the extended position;
   connnecting means for connecting said two side portions to each other, said connecting means being located at the end of said gut hook opposite to the end of the gut hook which is pivotably mounted on said knife handle so that said point of said hunting knife blade is protected when said hunting knife is moved in said direction for longitudinal cutting; and
   means defined by said knife handle for holding said gut hook in said extended position during said longitudinal cutting to prevent said gut hook from moving towards said retracted position.

12. A hunting knife as claimed in claim 11, wherein the end of each of said two side portions located opposite to the end of the gut hook pivotably mounted on said knife handle, define a hook shaped portion, said hook shaped portions space the entrails of the animal from the skin of the animal during field dressing when said gut hook is in the extended position to prevent contact of the entrails and skin with the point of the hunting knife blade and to lift the skin of the animal in advance of the skin being cut by said cutting edge.

13. A hunting knife for field dressing an animal, said hunting knife comprising:
   a knife handle;
   a hunting knife blade extending from one end of said knife handle, said hunting knife blade including a point located at the end of the hunting knife blade opposite to said knife handle and a cutting edge extending between said knife handle and said point;
   a gut hook pivotably mounted at one end on said handle for moving between a retracted positon and an extended position and said gut hook, when in said extended position, protects said point from contacting the entrails and the skin of the animal during longitudinal cutting of the skin of the animal in a direction extending ahead of said point of said hunting knife blade,
   said gut hook includes two side portions spaced from one another and located on opposite sides of said hunting knife blade when said gut hook is in the extended position;
   protection means defined by said gut hook for protecting said point of said hunting knife blade when said gut hook is in the extended position and when said hunting knife is moved in said direction for said longitudinal cutting; and
   stop means defined by said knife handle for stopping continued movement of said gut hook beyond said extended position when said gut hook is moved from said retracted position to said extended position so that said gut hook is held in said extended position during said longitudinal cutting.

14. A hunting knife for field dressing an animal, said hunting knife comprising:
   a knife handle;
   a hunting knife blade extending from one end of said knife handle, said hunting knife blade including a point located at the end of the hunting knife blade opposite to said knife handle and a cutting edge extending between said knife handle and said point;
   a gut hook pivotably mounted at one end on said handle for moving between a retracted position and an extended position and said gut hook, when in said extended position, protects said point from contacting the entrails and the skin of the animal during longitudinal cutting of the skin of the animal in a direction extending ahead of said point of said hunting knife blade;
   said gut hook includes two side portions spaced from one another and located on opposite sides of said hunting knife blade when said gut hook is in the extended position;
   protection means defined by said gut hook for protecting said point of said hunting knife blade when said gut hook is in the extended position and when said hunting knife is moved in said direction for said longitudinal cutting; and
   means defined by said knife handle for holding said gut hook in said extended position during said longitudinal cutting to prevent said gut hook from moving towards said retracted position.

* * * * *